United States Patent Office 3,662,074
Patented May 9, 1972

3,662,074
PHARMACEUTICAL COMPOSITIONS OF ANTI-ULCEROUS ACTIVITY
Lajos Voroshazy, Budapest, and Karoly Thuranszky and Andras Kekes-Szabo, Szeged, Hungary, assignors to Egyt Gyogyszervegyeszeti Gyar
Filed May 1, 1969, Ser. No. 820,950
Claims priority, application Hungary, May 9, 1968, VO-139
Int. Cl. A61k 27/00
U.S. Cl. 424—265
2 Claims

ABSTRACT OF THE DISCLOSURE

A pharmaceutical composition having synergetic ulcer-inhibiting activity contains as its active ingredients 0.5 to 1.5 parts by weight of triopine-xanthene-9-carboxylic acid ester metho-bromide (Gastrixon), 50 to 150 parts by weight of 1-benzyl-1-(3-dimethylamino-propoxy)-cycloheptane or its fumarate (Halidor) and optionally 0.5 to 1.0 part by weight of 2-diethylaminoethyl-benzylate (Amikon).

---

Figure 1:
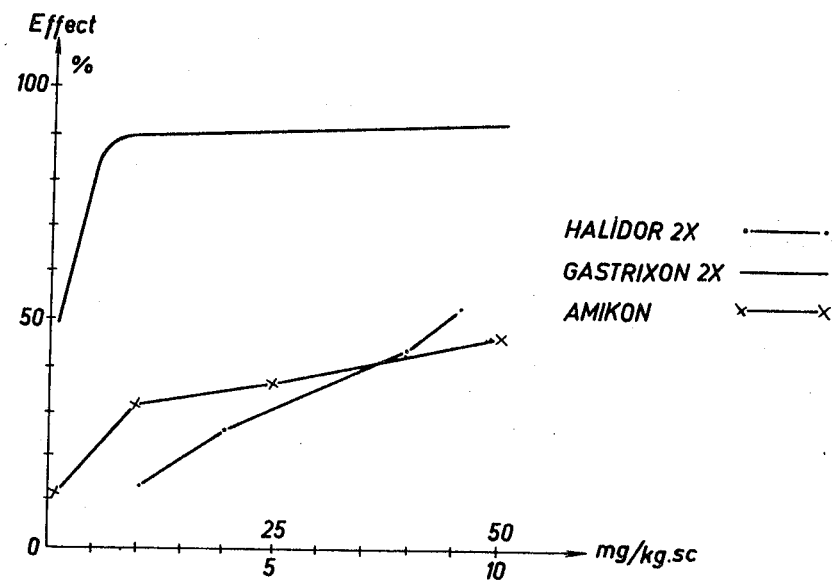

This invention relates to pharmaceutical compositions having anti-ulcerous activity.

It is well known, that tropine-xanthene-9-carboxylic acid ester methobromide (Gastrixon, G) has a strong parasympatholytic activity and a moderate ganglion-blocking effect. Its therapeutical index is 4 to 10 times better than that of Novatropine. According to our investigations, among the known antiulcerous substances this compound proved to be the most active agent against experimental gastric ulcer. (Kisérletes Orvostudomány, 4, 1 (1952)).

It is also known that 2-diethylamino-ethyl-benzylate (Amikon, A) has a marked parasympatholytic and spasmolytic effect besides its very favourable tranquillizing activity. This compound soothes quickly and energetically the cardial, pulmonary and gastrointestinal pains, especially those of chlorinerg character. When administered in a daily dosage of 2 to 4 mg., the normal working ability of ambulant patients is not disturbed. Side effects occur only very rarely with such doses, and if any, they are very slight. Some papers have reported, that the above compound exerts also a remarkable prophylactic activity against experimentally provoked ulcer. [Acta Pharmacol. Toxicol. 12, 346 (1956) and 11, 405 (1956), J. of Pharmacology 74, 290 (1946), Brit. Med. J. 1956. I.S. 952.]

1-benzyl-1-(3-dimethylamino - propoxy)-cycloheptane, and the salts thereof (i.e. its fumarate: Halidor, H) are very strong spasmolytic and minor tranquillizing agents (Oe. Pat. No. 264,495). According to some experimental data, these compounds exert also a marked prophylaxis against experimentally provoked gastric ulcer. (The pharmacology of Halidor, Budapest, 1966.)

The present invention is based on the unexpected feature that pharmaceutical compositions containing as active ingredients tropine-xanthene-9-carboxylic acid ester methobromide, 1-benzyl-1-(3-dimethylamino-propoxy)-cycloheptane or a salt thereof, and optionally 2-diethylamino-ethyl-benzylate, exert a marked anti-ulcerous activity, far exceeding the additive effect of the compounds given separately. On the other hand, the toxicity values of the new compositions are substantially lower, than those of the separate components.

The synergetic ulcer-inhibitory activity of the above mentioned compositions appears in immobilisation ulcer and in acute cases provoked by Reserpine, as well as in chronic diseases effected by Atophan and Phenylbutazon.

Accordingly, this invention relates to pharmaceutical compositions containing as active ingredients tropine-xanthene-9-carboxylic acid ester methobromide, 1-benzyl-1-(3-dimethylamino-propoxy)-cycloheptane or a salt thereof and optionally 2-diethylamino-ethyl-benzylate.

1-benzyl-1-(3-dimethylamino - propoxy)-cycloheptane can be used in the above compositions either in the form of the free base, or as a salt thereof. The salts may be formed with e.g. hydrochloric, hydrobromic, maleic, fumaric, sulfuric, maleinic, and p-toluolsulfonic acid. Especially preferable derivatives are the hydrochloride and fumarate salts.

The novel pharmaceutical compositions can be prepared by admixing the active ingredients with carriers, binding flavouring, surface-active, wetting etc. agents usable in the pharmaceutical industry. The compositions can be prepared in the form of tablets, pills, capsules, coated tablets, aqueous or oily solutions, emulsions, suspensions, injectable solutions or suppositories for oral, parenteral as well as for rectal use.

The orally administerable compositions (e.g. tablets, pills, coated tablets, capsules etc.) contain preferably tropine-xanthene-9-carboxylic acid ester methobromide, 1-benzyl-1-(3-dimethylamino - propoxy)-cycloheptane or a salt thereof, and optionally 2-diethylamino-ethyl-benzylate in ratios of 0.5 to 1.5:50 to 150:0.5 to 1.0. A preferred oral composition contains 1 mg. of tropine-xanthene-9-carboxylic acid ester methobromide, 150 mg. of 1-benzyl-1-(3-dimethylamino-propoxy)-cycloheptane fumarate and, if desired, 1 mg. of 2-diethylamino-ethyl-benzylate per dosage units. This oral composition can be administered to adults preferably three times a day, but higher or lower doses can also be used.

Injectable solutions containing tropine-xanthene-9-carboxylic acid ester methobromide and 1-benzyl-1-(3-dimethylamino-propoxy)-cycloheptane fumarate or hydrochloride in the ratio of 1:100 proved to be the most suitable for parenteral use. The parenteral compositions contain preferably 0.5 mg. of tropine-xanthene-9-carboxylic acid ester methobromide and 50 mg. of 1-benzyl-1-(3-dimethylamino-propoxy)-cycloheptane fumarate per dosage unit.

The preparation of the compositions according to the present invention is described in the following examples. The examples are given for the purpose of illustration and not by way of limitation. 1-benzyl-1-(3-dimethyl-amino-propoxy)-cycloheptane is applied in the compositions listed below in the form of the fumarate salt thereof, however, it is obvious to those skilled in the art, that the free base or other salts thereof similarly can be used.

EXAMPLE 1

Composition of one tablet containing Halidor, Gastrixon and Amiikon.

|  | G. |
|---|---|
| 1 - benzyl-1-(3-dimethylamino - propoxy) - cycloheptane fumarate | 0.1500 |
| Tropine-xanthene-9-carboxylic acid ester methobromide | 0.0010 |
| 2-diethylamino-ethyl-benzylate | 0.0010 |
| Lactose | 0.1800 |
| Starch | 0.1218 |
| Gelatine | 0.0072 |
| Talc | 0.0140 |
| Magnesium stearate | 0.0050 |

1500 g. of 1 - benzyl-1-(3-dimethylamino-propoxy)-cycloheptane fumarate, 10 g. of tropine-xanthene-9-carboxylic acid ester methobromide, 10 g. of 2-diethylamino-ethyl-benzylate, 1800 g. of lactose and 600 g. of starch are thoroughly blended and mixed with the aqueous solution of 72 g. of gelatine. The obtained mass is passed through a No. 14 mesh sieve. The product is dried, passed through a No. 16 mesh sieve, then 618 g. of starch, 140 g. of talc and 50 g. of magnesium stearate are added. The mixture is thoroughly blended. The obtained homogenous mixture is pressed on a rotary tabletting machine into 10,000 tablets (diameter: 12 mm.), each weighing 0.48 g.

EXAMPLE 2

Composition of one tablet containing Halidor and Gastrixon.

|  | G. |
|---|---|
| 1 - benzyl-1-(3-dimethylamino - propoxy) - cycloheptane fumarate | 0.1500 |
| Tropine-xanthene-9-carboxylic acid ester methobromide | 0.0010 |
| Lactose | 0.1800 |
| Starch | 0.1228 |
| Gelatine | 0.0072 |
| Talc | 0.0140 |
| Magnesium stearate | 0.0050 |

1500 g. of 1-benzyl-1-(3-dimethylamino-propoxy)-cyclopheptane fumarate, 10 g. of tropine-xanthene-9-carboxylic acid ester methobromide, 1800 g. of lactose and 600 g. of starch are thoroughly blended and mixed with the aqueous solution of 72 g. of gelatine. The obtained mass is passed through a No. 14 mesh sieve. The product is dried, passed through a No. 16 mesh sieve, then 628 g. of starch, 140 g. of talc and 50 g. of magnesium stearate are added. The mixture is thoroughly blended. The obtained homogenous mixture is pressed on a rotary tabletting machine into 10,000 tablets (diameter: 12 mm.), each weighing 0.48 g.

EXAMPLE 3

Preparation of injectable solutions

Composition of one ampoule containing Halidor and Gastrixon.

|  | G. |
|---|---|
| 1 - benzyl-1-(3-dimethylamino - propoxy) - cycloheptane fumarate | 0.0500 |
| Tropine-xanthene-9-carboxylic acid ester methobromide | 0.0005 |
| Aminoacetic acid | 0.0148 |
| Sodium hydroxide | 0.0040 |
| Ethanol (96%), 0.1000 ml. |  |
| Distilled water q.s., ad 2.00 ml. |  |

50.0 g. of 1 - benzyl-1-(3-dimethylamino-propoxy)-cycloheptane fumarate and 100 ml. of 96% ethanol are placed into a 3-liter Erlenmeyer flask. The mixture is shaken, then 1500 ml. of distilled water are added, and the pH of the mixture is adjusted to 5.0–5.6 by adding about 100 ml. of 0.1 N aqueous sodium hydroxide solution in portions. After dissolving the total quantity of 1-benzyl-1-(3-dimethylamino - propoxy)-cycloheptane fumarate the pH of the solution is measured and if necessary, it is adjusted to 5.0–5.6 by adding 1 N aqueous sodium hydroxide solution or 1 N aqueous hydrochloric acid solution. Thereafter the flask is covered with a black veil, 0.50 g. of tropine-xanthene-9-carboxylic acid ester methobromide and 14.86 g. of aminoacetic acid are added, and the mixture is shaken until the dissolution is complete. The flask is filled with distilled water to 3 liters, and the solution is shaken. The solution is filtered on a G4 sintered glass filter, the filtrate is divided in ampoulles, the ampoulles are sealed and sterilized for 30 minutes at 100° C.

The synergetic ulcer-inhibitory effect of the compositions according to the present invention is demonstrated by the following pharmaological tests.

Methods of estimation

According to the data given in the literature (Menguy. Am. J. Dig. Dis. 5, 911 (1960), Brodie et al.: Physiologist 4, 14 (1961)) the immobilisation test is the most suitable for the successful estimation of the anti-ulcerous activity of drugs expectable in human organism.

Another widely used method is studying the inhibitory effect exerted on Reserpine ulcer and chronic ulcerous diseases caused by Atophan and Phenylbutazon, taking into consideration, that these types of ulcer show a histological appearance quite similar to that of human ulcers, furthermore, the above types of ulcer behave most similarly to the human diseases with respect to the course of illness.

We have investigated the ulcer-inhibitory effect of the separate compounds and of the compositions according to the present invention on four types of experimental ulcer. After 48 hours of starvation, immobilisation ulcer has been provoked on rats by fastening the animals in supination on a board. The lesions have been evaluated after 24 hours. In the course of the examination of Reserpine ulcer 5 mg./kg. doses of Reserpine have been added subcutaneously to the animals after 48 hours of starvation, and the animals have been sacrificed after 24 hours. The administration of drugs has been carried out a equal intervals within 24 hours to ensure a relatively constant drug level. The evaluation of the results has been carried out by determination of the ulcer indexes (U.I.). The ulcer index has been calculated as follows: every mm.$^2$ of deteriorated surface=1, bleeding=5, perforation=10. The average ulcer index of the animal groups has been calculated from the thus-obtained data, and these average values have been compared with the indexes calculated from the results observed in the control groups. The differences have been expressed in percents; the average ulcer index determined in the case of the control group has been regarded as 100%. The thus-obtained percentage values are characteristic to the inhibitory effect.

The ulcer-inhibitory activity exerted against chronic diseases has been determined in rats pre-treated intraperitoneally with Atophan and Phenylbutazon. The ulcer-provoking agents have been added daily for 10 days; on the 11th day the animals have been sacrifised. The lesions have been evaluated by the determination of ulcer indexes. The ulcer index has been calculated as described above, i.e. every mm.$^2$ of acute deteriorated surface=0.5, every mm.$^2$ of chronic deteriorated surface=1, bleeding=5, perforation=10. The degree of inhibition has been expressed in percents, as indicated above.

We have used 2525 white rats in our experiments, taking care, that the distribution of both sexes should be the same in each of the groups. The groups consisted of at least 8 animals, and the experiments have been repeated at least two times. Accordingly, the results are obtained from the data of at least 3 experiments carried out at different times.

Results

First of all on the basis of the results of the immobilisation and Reserpine ulcer experiments the curve of efficiency has ben plotted. The results are shown in Tables 1 and 2, and in FIGS. 1 and 2.

FIG. 1 shows the curve of efficiency of tropine-xanthene-9-carboxylic acid ester methobromide (Gastrixon, G), 1-benzyl-1-(3-dimethylamine-propoxy)-cycloheptane fumarate (Halidor, H) and 2-diethylamino-ethyl-benzylate (Amikon, A) in immobilisation ulcer. The percentage values of efficiency are indicated on the ordinate, and the doses in mg./kg. are indicated on the abscissa. The upper scale of the abscissa shows the administered doses of Halidor, the lower scale indicate those of Gastrixon and Amikon, respectively. The indicated doses of Halidor and Gastrixon have been administered two times a day, at intervals of 12 hours, respectively.

Figure 2:
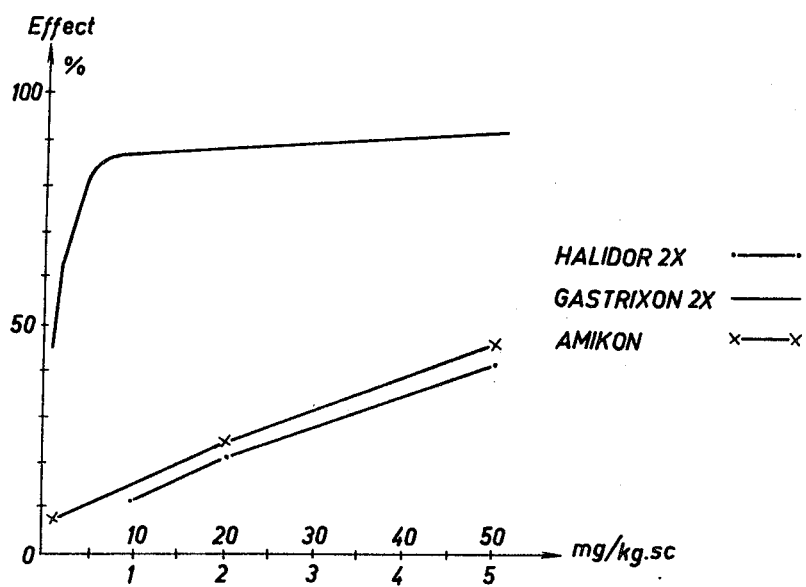

FIG. 2 shows the curve of efficiency of tropine-xanthene-9-carboxylic acid ester methobromide (Gastrixon, G), 1-benzyl-1-(3-dimethylamino-propoxy)-cycloheptane fumarate (Halidor, H) and 2-diethylamino-ethyl-benzylate (Amikon, A) in Reserpine ulcer. On the ordinate there are indicated the percentage values of efficiency, on the abscissa there are given the appropriate doses. The two scales of the abscissa have the same meanings as given above. The indicated doses of Halidor and Gastrixon have been administered two times a day, at intervals of 12 hours, respectively.

TABLE 1

The effect of tropine-xanthene-9-carboxylic acid ester methobromide (Gastrixon), 1-benzyl-1-(3-dimethylamino-propoxy)-cycloheptane fumarate (Halidor) and 2-diethylamino-ethyl-benzylate (Amikon) in immobilisation ulcer

| No. of animals | Administered compound | Dosis, mg./kg. | Method of administration | U.I. | Inhibition, percent |
|---|---|---|---|---|---|
| 104 | Phys. saline | [1]2 | S.c. | 11.0 | 0 |
| 30 | Gastrixon | 3×30 | S.c. | 1.43 | 87 |
| 24 | do | 3×10 | S.c. | 0.99 | 91 |
| 30 | do | 2×1 | S.c. | 1.43 | 87 |
| 24 | do | 1×1 | S.c. | 0.99 | 91 |
| 50 | do | 2×0.5 | S.c. | 3.52 | 68 |
| 52 | do | 2×0.2 | S.c. | 5.61 | 49 |
| 46 | Halidor | 2×10 | S.c. | 9.46 | 14 |
| 45 | do | 2×20 | S.c. | 8.14 | 26 |
| 24 | do | 2×40 | S.c. | 6.16 | 44 |
| 40 | do | 3×30 | S.c. | 5.17 | 53 |
| 30 | Amikon | 2×0.1 | S.c. | 9.79 | 11 |
| 30 | do | 1×2 | S.c. | 7.70 | 30 |
| 30 | do | 1×5 | S.c. | 7.04 | 36 |
| 30 | do | 2×5 | S.c. | 5.61 | 49 |
| 30 | Tap water | [2]5 | P.o. | 9.50 | 0 |
| 30 | Halidor | 1×80 | P.o. | 7.40 | 22 |
| 30 | Gastrixon | 2×5 | P.o. | 1.14 | 88 |
| 24 | do | 1×5 | P.o. | 3.43 | 66 |
| 24 | do | 1×3 | P.o. | 4.18 | 56 |
| 30 | do | 1×2 | P.o. | 5.44 | 45 |
| 30 | do | 1×1 | P.o. | 6.84 | 28 |

[1] Ml. [2] Ml./kg.

TABLE 2

The effect of tropine-xanthene-9-carboxylic acid ester methobromide (Gastrixon), 1-benzyl-1-(3-dimethylamino-propoxy)-cycloheptane fumarate (Halidor) and 2-diethylamino-ethyl-benzylate (Amikon) in Reserpine ulcer

| No. of animals | Administered compound | Dosis, mg./kg. | Method of administration | U.I. | Inhibition, percent |
|---|---|---|---|---|---|
| 116 | Phys. saline | [1]2 | S.c. | 10.5 | 0 |
| 26 | Gastrixon | 3×10 | S.c. | 0.52 | 95 |
| 30 | do | 1×1 | S.c. | 1.78 | 83 |
| 40 | do | 2×0.5 | S.c. | 1.68 | 84 |
| 45 | do | 2×0.2 | S.c. | 3.78 | 64 |
| 30 | do | 2×0.1 | S.c. | 5.98 | 43 |
| 30 | Halidor | 2×10 | S.c. | 9.34 | 11 |
| 50 | do | 2×20 | S.c. | 8.29 | 21 |
| 26 | do | 2×50 | S.c. | 5.88 | 44 |
| 30 | Amikon | 2×0.1 | S.c. | 9.76 | 7 |
| 30 | do | 1×2 | S.c. | 7.77 | 26 |
| 30 | do | 1×5 | S.c. | 5.46 | 48 |
| 24 | Tap water | [1]5 | P.o. | 9.80 | 0 |
| 24 | Gastrixon | 2×3 | P.o. | 3.92 | 60 |
| 24 | Halidor | 1×80 | P.o. | 6.07 | 38 |

[1] Ml./kg.

Thereafter the effects of the compositions according to the present invention has been investigated against immobilisation and Reserpine ulcer. The following compositions have been tested.

(1) Tropine-xanthene-9-carboxylic acid ester methobromide (Gastrixon)+1 - benzyl - 1-(3-dimethylaminopropoxy)-cycloheptane fumarate (Halidor).

(2) Tropine-xanthene-9-carboxylic acid ester methobromide (Gastrixon)+1-benzyl - 1 - (3-dimethylaminopropoxy)-cycloheptane fumarate (Halidor)+2 - diethylamine-ethyl-benzylate (Amikon).

Figure 3:
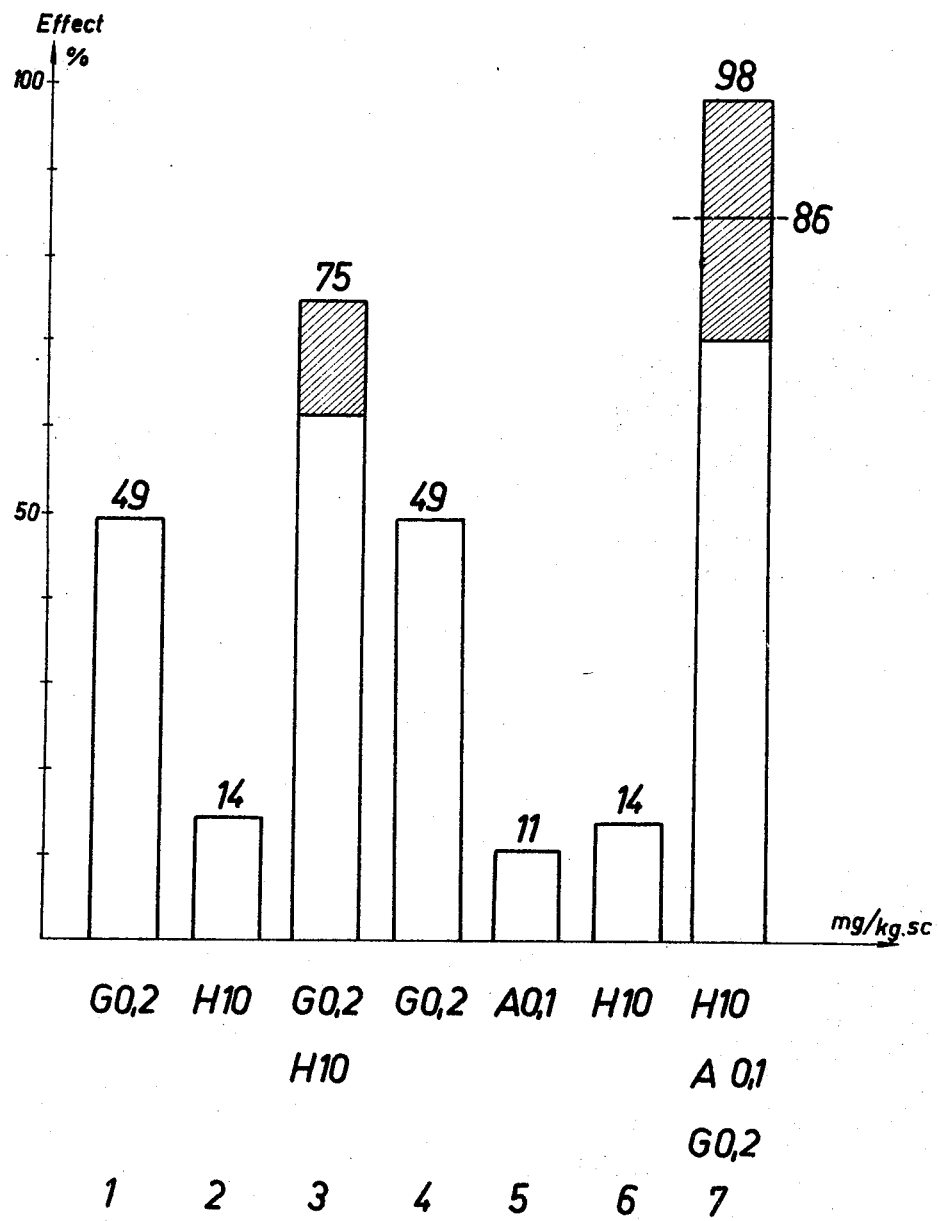
Figure 4:
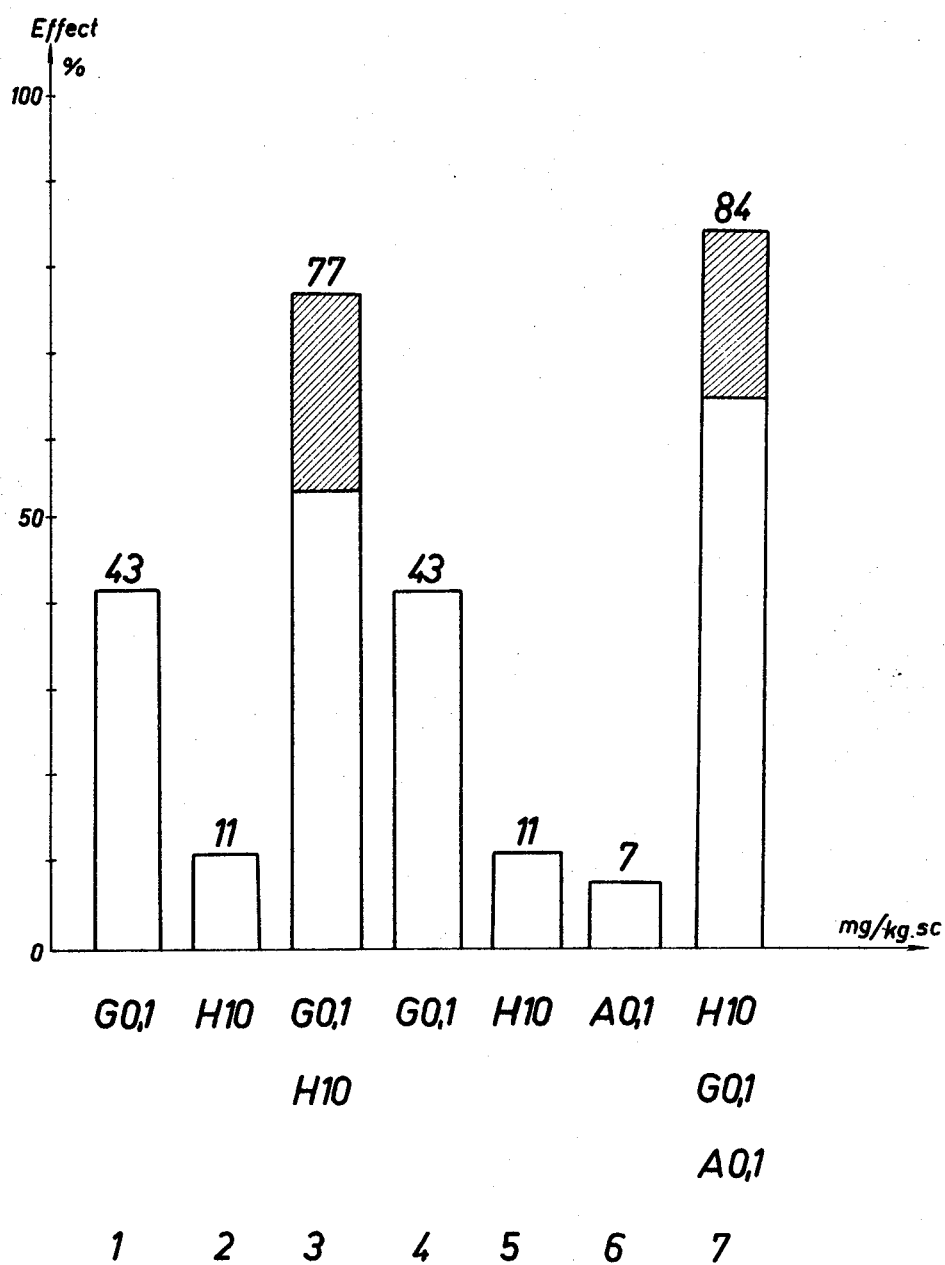

The results are shown in Tables 3 and 4, as well as in FIGS. 3 and 4.

FIG. 3 relates to the effect of the separate compounds as well as of the compositions in immobilisation ulcer, while FIG. 4 shows the corresponding values measured in Reserpine ulcer.

The ordinate of the figures shows the percentage values of effectiveness.

The first column indicates the effectiveness of a 0.1 mg./kg. (or 0.2 mg./kg.) dosis of Gastrixon, the second column shows that of a 10 mg./kg. dosis of Halidor, and the third column shows the effectiveness of a dosis of the composition containing 0.1 mg./kg. (or 0.2 mg./kg.) of Gastrixon and 10 mg./kg. of Halidor. The hatched areas of the third columns indicate the degree of synergism, i.e. to what extent the effect of the composition is greater than the additive effect of the separate active ingredient. It turns out, that compositions containing tropine-xanthene-9-carboxylic acid ester methobromide and 1-benzyl-1-(3-dimethylamino-propoxy)-cycloheptane fumarate show a marked synergism in the case of immobilisation ulcer as well as in the case of Reserpine ulcer.

The fourth, fifth and sixth columns of the figures show the percentage values of effectiveness of a 0.2 mg./kg. (or 0.1 mg./kg.) dosis of Gastrixon, a 10 mg./kg. dosis of Halidor and a 0.1 mg./kg. dosis of Amikon, respectively.

The seventh columns of FIG. 3 and FIG. 4 indicate the effectiveness of a dosis of the composition containing 0.2 mg./kg. of Gastrixon, 10 mg./kg. of Halidor and 0.1 mg./kg. of Amikon, and that of a dosis of the composition which contains 0.1 mg./kg. of Gastrixon, 10 mg./kg. of Halidor and 0.1 mg./kg. of Amikon, respectively. The hatched areas of the columns indicate the degree of synergism, i.e. to what extent the effect of the composition is greater than the additive effect of the separate active ingredient. The dotted lines crossing these columns indicate the additive level of effectiveness of the first synergetic composition (i.e. a composition containing Gastrixon and Halidor) and of Amikon. It can be noted, that by adding the indicated value of Amikon to the first synergetic composition the total ulcer-inhibitory effect shows an unexpected increase, accordingly a synergetic interaction of the first composition and of Amikon takes place too.

The figures indicate, that a composition containing tropine-xanthene-9-carboxylic acid ester methobromide, 1-benzyl - 1 - (3-dimethylamino-propoxy)-cycloheptane fumarate and 2-diethylaminoethyl-benzylate show an antiulcerous effect far exceeding the additive effect of the active ingredients given separately.

TABLE 3

The effect of the compositions according to the present invention in immobilisation ulcer. Gastrixon=tropine-xanthene-9-carboxylic acid ester methobromide; Halidor=1-benzyl-1-(3-dimethylamino-propoxy)-cycloheptane fumarate; Amikon=2-diethylamino-ethyl-benzylate

| No. of animals | Administered compounds | Dosis, mg./kg. | Method of administration | U.I. | Inhibition, percent |
|---|---|---|---|---|---|
| 50 | Phys. saline | [1]2 | S.c. | 11.0 | 0 |
| 40 | Gastrixon plus Halidor | 2× (0.5+20) | S.c. | 2.09 | 81 |
| 50 | do | 2× (0.2+20) | S.c. | 1.54 | 86 |
| 30 | do | 2× (0.2+10) | S.c. | 2.75 | 75 |
| 50 | Gastrixon plus Amikon plus Halidor | 2× (0.2+0.1+10.0) | S.c. | 0.22 | 98 |

[1] Ml./kg.

TABLE 4

The effect of the compositions according to the present invention in Reserpine Ulcer. Gastrixon = tropine-xanthene-9-carboxylic acid ester methobromide, Halidor = 1-benzyl-1-(3-dimethylamino-propoxy)-cycloheptane fumarate, Amikon = 2-diethylamino-ethyl-benzylate

| No. of animals | Administered compounds | Dosis, mg./kg. | Method of administration | U.I. | Inibitition, percent |
|---|---|---|---|---|---|
| 50 | Phys. saline | [1] 2×2 | S.c. | 10.0 | 0 |
| 30 | Gastrixon plus Halidor | 2×(0.5+10) | S.c. | 0.8 | 93 |
| 40 | do | 2× (0.2+20) | S.c. | 1.6 | 84 |
| 24 | do | 2× (0.1+10) | S.c. | 2.3 | 77 |
| 50 | Gastrixon plus Amkion plus Halidor. | 2× (0.1+0.1+10) | S.c. | 1.9 | 84 |
| 50 | do | 2× (0.2+0.1+10) | S.c. | 0.6 | 94 |

[1] Ml./kg.

The anti-ulcerous effect of one of the compositions exerted against chronic Phenylbutazon-ulcer is shown in Table 5. The data indicate, that the components have a good anti-ulcerous effect when administered separately; but the composition containing all the three active ingredients shows an excellent and marked, a better inhibitory effect.

these toxicity data have been determined separately on the same strain of mouse used in our other experiments. The determination has been carried out by the Litchfield-Wilcoxon method on mice of both sexes, each weighing 20 to 30 g. The compounds have been administered subcutaneously.

TABLE 5

The effect of tropine-xanthene-9-carboxylic acid ester methobromide (Gastrixon), 1-benzyl-1-(3-dimethylamino-propoxy)-cycloheptane furmarate (Halidor), 2-diethylamino-ethyl-benzylate (Amikon) and the composition thereof against chronic Phenylbutazon ulcer

| No. of animals | Administered compounds | Dosis, mg./kg. | Method of administration | U.I. | Inibitition, percent |
|---|---|---|---|---|---|
| 40 | Phys. saline | [1] 2 | S.c. | 16.0 | 0 |
| 25 | Gastrixon | 1×0.2 | S.c. | 1.92 | 88 |
| 25 | Halidor | 1×10 | S.c. | 6.4 | 60 |
| 25 | Amikon | 1×0.1 | S.c. | 8.64 | 46 |
| 40 | Amikon plus Gastrixon plus Halidor. | 1× (0.1+0.2+10) | S.c. | 0.32 | 98 |

[1] Ml./kg.

For the sake of completeness, it has also been examined, whether the ulcer-inhibitory activities of compositions containing tropine-xanthene-9-carboxylic acid ester methobromide and 2-diethylamino-ethyl-benzylate, and of those containing 2-diethylamino-ethyl-benzylate and 1-benzyl-1-(3-dimethylamino-propoxy)-cycloheptane fumarate show an unexpected increase or not. According to our investigations the ulcer-inhibitory activity of these compositions is almost equal to the additive effects of the ingredients, or a slight, non-significant synergism takes place. Namely, a composition containing 0.1 mg./kg. 2-diethylamino-ethyl-benzylate and 10 mg./kg. 1-benzyl-1-(3-dimethylamino-propoxy)-cycloheptane fumarate inhibits immobilisation ulcer only in 27 percent; while the inhibitory effect of the composition containing 0.2 mg./kg. tropine-xanthene-9-carboxylic acid ester methobromide and 0.1 mg./kg. 2-diethylamino-ethyl-benzylate exerted on the same type of ulcer is 63 percent.

Examination of the toxicity values

With respect to the synergetic anti-ulcerous effect of the above compounds, first of all it had to be examined, whether the synergism of the therapeutical effect is accompanied with a synergism or addition of the toxicity.

Although the toxicity values of the three active ingredients are well known, for the sake of completeness, The results are summarized in Table 6.

TABLE 6

Toxicity of tropine-xanthene-9-carboxylic acid ester methobromide (Gastrixon), 1-benzyl-1-(3-dymethylamino-propoxy)-cycloheptane fumarate (Halidor) and 2-diethylamino-ethylbenzylate (Amikon) on mice

| Compound | $LD_{50}$ mg./kg., s.c. | $LD_{100}$ mg./kg., s.c. |
|---|---|---|
| Gastrixon | 326 | 380 |
| Halidor | 400 | 460 |
| Amikon | 136 | 180 |

Thereafter the mixture of tropine-xanthene-9-carboxylic acid ester methobromide (Gastrixon) and 1-benzyl-1-(3-dimethylamino-propoxy)-cycloheptane fumarate (Halidor) has been examined, to know whether the toxicity values of the active ingredients were additive or synergistic. The experiments have been carried out as follows: 0.5× $LD_{50}$ and 0.75 $LD_{50}$ amounts of the compounds (i.e. 163 mg./kg. and 244.5 mg./kg. of Gastrixon, as well as 200 mg./kg. and 300 mg./kg. of Halidor) have been given to the animals. By administering one half of the $LD_{50}$ value of each compound it could be expected, that the case of additive toxicity about half of the tested animals would perish, and by giving 0.75× $LD_{50}$ amounts of each compound, the rate of perishment would be even greater. The results are summarized in Table 7.

TABLE 7

| No. of animals | Amount of— | | Perishment percent |
| --- | --- | --- | --- |
| | Gastrixon, mg./kg. | Halidon, mg./kg. | |
| 10 | 163 (=0.5× LD$_{50}$) | 200 (=0.5× LD$_{50}$) | 20 |
| 10 | 244.5 (=0.75× LD$_{50}$) | 300 (=0.75× LD$_{50}$) | 30 |

From the table above it turns out, that the rate of perishment is significantly lower than 50 percent in both cases, accordingly, the toxicity values of tropine-xanthene-9-carboxylic acid ester methobromide (Gastrixon) and of 1 - benzyl - 1 - (3 - dimethylamino - propoxy)-cycloheptane fumarate (Halidor) are not even additive. On contrary, by administering 0.75× LD$_{50}$ amounts of both compounds, among the 10 animals examined only 3 died, accordingly, an antagonism of the toxicities can be observed.

We have also investigated the toxicity values of compositions containing as active ingredients the mixture of tripine-xanthene-9-carboxylic acid ester methobromide and 2-dethylamino-ethyl-benzylate and the mixture of 2-diethylamino - ethyl - benzylate and 1 - benzyl - 1 - (3-dimethylaminopropoxy) - cycloheptane fumarate, respectively. No synergism of the toxicity values could be observed.

Thereafter 0.333× LD$_{50}$ and 0.5× LD$_{50}$ amounts of all the three active ingredients (i.e. 108.6 mg./kg. and 163 mg./kg. of Gastrixon, 133.3 mg./kg. and 200 mg./kg. of Halidor and 45.3 mg./kg. and 68 mg./kg. of Amikon, respectively) have been administered subcutaneously to groups containing 20 mice. The results are summarized in Table 8. When administering 0.333× LD$_{50}$ amounts of each compound, it could be expected, that in the case of additive toxicity about half of the tested animals will perish, and when one half of the LD$_{50}$ value of each compound are given, the rate of perishment will be greater than 50 percent.

From the data it turns out, that the rate of perishment is far lower than it could be expected. Accordingly the toxicities of the active ingredients are not additive, even an antagonism of the toxicities can be observed.

Thereafter we have determined the toxicity values of the composition containing as active ingredients tropine-xanthene-9-carboxylic acid ester methobromide (Gastrixon), 2 - diethylamino - ethyl - benzylate (Amikon) and 1 - benzyl - 1 - (3 - dimethylamino - propoxy) - cycloheptane fumarate (Halidor) in the ratios of 1:1:150. The results are summarized in Table 9.

TABLE 9

Toxicity values of the composition containing tropinexanthene-9-carboxylic acid ester methobromide (Gastrixon), 2-diethyl-amino-ethyl-benzylate (Amikon) and 1-benzyl-1-(3-dimethyl-amino-propoxy)-cycloheptane fumarate (Haildor), in the ratios of 1:1:150

| Toxicity, mg./kg. | Method of administration | Test animal |
| --- | --- | --- |
| LD$_{50}$=433.2 | S.c. | Mouse. |
| LD$_{100}$=478.8 | S.c. | Do. |
| LD$_{50}$=1,298.0 | P.o. | Rat. |

What we claim is:

1. A pharmaceutical composition having synergetic ulcer-inhibiting activity, containing as effective ingredients about 0.5 to 1.0 part by weight of tropine-xanthene-9-carboxylic acid ester metho-bromide and about 50 parts by weight of 1 - benzyl - 1 - (3 - dimethylamino - propoxy)-cycloheptane fumarate.

2. A pharmaceutical composition as claimed in claim 1, and about 0.5 part by weight of 2-diethylaminoethyl-benzylate.

TABLE 8

Gastrixon=tropine-xanthene-9-carboxylic acid ester methobromide, Halidor=1-benzyl-1-(3-dimethylamino propoxy)-cycloheptane fumarate, Amikon=2-diethylamino-ethylbenzylate

| No. of animals | Amount of— | | | Perishment percent |
| --- | --- | --- | --- | --- |
| | Gastrixon, mg./kg. | Halidor, mg./kg. | Amikon, mg./kg. | |
| 20 | 108.6 (0.333× LD$_{50}$) | 133.3 (0.333× LD$_{50}$) | 45.3 (0.333× LD$_{50}$) | 10 |
| 20 | 163 (0.5× LD$_{50}$) | 200 (0.5× LD$_{50}$) | 68 (0.5× LD$_{50}$) | 35 |

References Cited

FOREIGN PATENTS 264,495    9/1968    Austria.

OTHER REFERENCES

Javor et al.: Chem. Abst., vol. 64, 1966, pp. 13,270–1.
Melzobs et al.: Chem. Abst., vol 52, 1958, p. 13098.
Hauschild et al.: Chem. Abst., vol. 66, 1967, 17900d.
Simonyi et al.: Chem. Abst. vol. 66, 1967, 22270c.
Orzechowska: Chem. Abst. vol. 67, 1967, 20290f.
Takagi et al.: Chem. Abst., vol. 52, 1958, pp. 18, 874.

ALBERT T. MEYERS, Primary Examiner

A. J. ROBINSON, Assistant Examiner

U.S. Cl. X.R.

424—308, 330